R. F. McCLOSKEY.
PUNCHING AND SHEARING MECHANISM.
APPLICATION FILED OCT. 9, 1912.
1,167,771.
Patented Jan. 11, 1916.
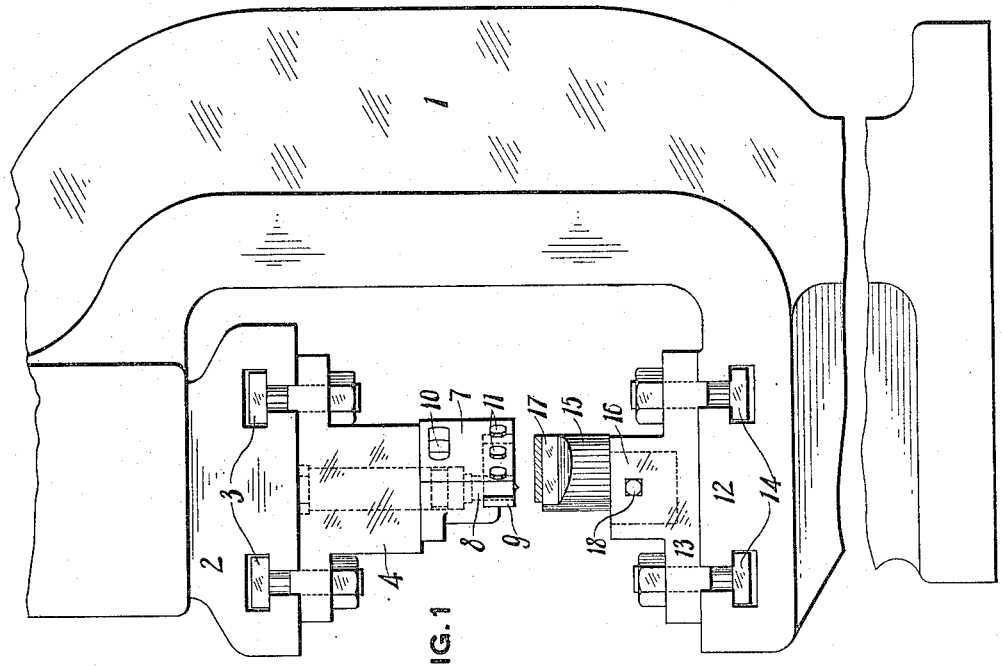
FIG. 1
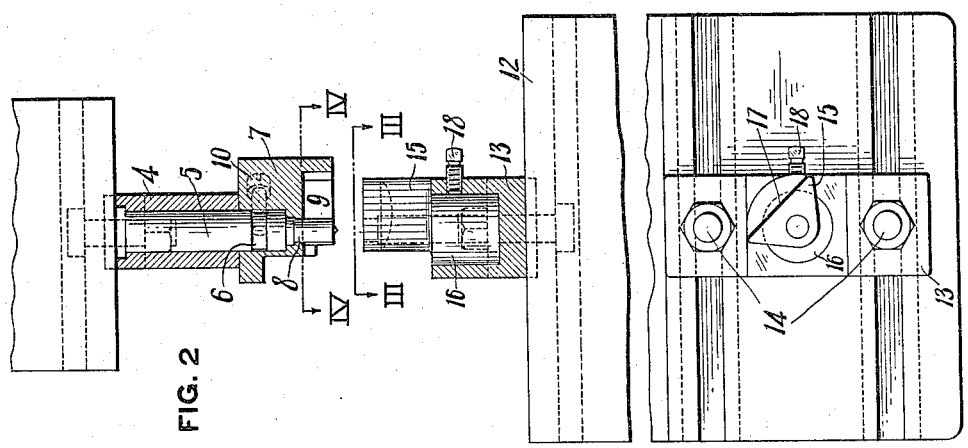
FIG. 2
FIG. 3
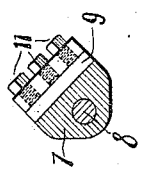
FIG. 4
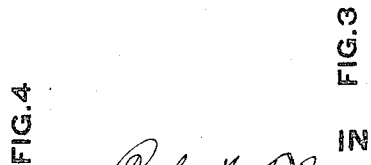
WITNESSES
INVENTOR
Robert F. McCloskey
by W. C. Doolittle
Attorney

UNITED STATES PATENT OFFICE.

ROBERT F. McCLOSKEY, OF PITTSBURGH, PENNSYLVANIA, ASSIGNOR TO RITER-CONLEY MANUFACTURING COMPANY, OF PITTSBURGH, PENNSYLVANIA, A CORPORATION OF NEW JERSEY.

PUNCHING AND SHEARING MECHANISM.

1,167,771.

Specification of Letters Patent. Patented Jan. 11, 1916.

Application filed October 9, 1912. Serial No. 724,704.

*To all whom it may concern:*

Be it known that I, ROBERT F. MC-CLOSKEY, a citizen of the United States, of Pittsburgh, in the county of Allegheny and State of Pennsylvania, have invented certain new and useful Improvements in Punching and Shearing Mechanism, of which the following is a specification.

The prime object of the present invention is to provide a new and improved punching and shearing mechanism, particularly designed for cutting off at any desired angle the corner of a plate or structural piece at the same time a hole or holes are punched in a plate or angular metallic member.

In the accompanying drawing, which illustrates an application of my invention, Figure 1 is a side elevational view showing a portion of a punching machine with my invention applied thereto; Fig. 2, a vertical sectional view of the upper die-block and adjustable tool holder and the lower die-block and combined shear and die; Fig. 3, a plan view taken on line III—III of Fig. 2; and Fig. 4, horizontal section taken on line IV—IV of Fig. 2.

Referring to the drawing, 1 designates a portion of a housing of a punching machine, and 2 a vertically movable head block of the usual and well known construction.

Secured to the vertically movable head-block 2 by means of bolts 3, I provide an upper die-block 4. Die block 4 is formed with a vertically extending aperture designed to receive a member 5, said member 5 being formed on its periphery with an annular groove 6.

Surrounding the depending member 5 and adjustably secured thereto, is a tool holder 7 designed to carry a punch 8 and a detachable cutting knife 9. As illustrated, the tool holder is secured to member 5 by means of a screw 10 passed through the holder and having its inner end entered in the groove 6 of member 5. The knife 9 is detachably secured to the holder by means of screws 11. The construction of tool holder, as described, and means for securing it to the upper die-block or to the member 5 thereof, permits the said tool holder, together with the cutting knife, to be turned or adjusted into any desired position relatively to the piece desired to be operated upon, and this, it will be noted, may be accomplished without changing the position of the vertically movable punch.

Secured to the lower jaw 12 of the punching machine is a lower stationary die-block or holder 13, said die-block or holder being attached to the lower jaw by means of bolts 14.

Located in the die-block or holder 13, I provide a combined shear and die 15. This member 15, as illustrated, comprises a lower circular portion 16 formed with a punch receiving opening, and an upper portion formed with a punch receiving opening and with a shearing edge 17 adapted for coöperation with the shear knife 9 secured to the vertically reciprocating tool holder 7.

The combined punch and shearing tool or member 15 is adapted to be revolved within the die-block or holder 13 in order to bring its cutting edge 17 into proper position relatively to the cutting knife carried by the reciprocating tool holder 7. 18 designates a binding screw passed through the holder and adapted to engage the lower portion 16 of member 15 to lock and maintain the member in the desired operative position.

From the foregoing, it will be seen that the operation of punching and cutting or shearing may be effected by a single stroke of the plunger, and that the shearing mechanism is of such a character as to permit it to be adjusted to cut off the corner at any desired angle or bevel.

What I claim is:—

1. In punching and shearing mechanism, a longitudinally movable supporting member, a tool holder movable therewith and rotatable thereon, said holder having a shear tool seat spaced from the axis of adjustment with the direction of length of the seat angular with respect to a radius of such axis, whereby adjustment of a tool holder will provide variations in angularity of the shear tool and permit shear cutting on planes non-intersecting with respect to such axis.

2. In punching and shearing mechanism, a longitudinally movable supporting member, a tool holder movable therewith and rotatively adjustable thereon, said holder having a shear tool seat spaced from the axis of adjustment, whereby adjustment of the tool holder will provide variations in angularity of the shear tool, said holder having a punch receiving opening with its axis corresponding to the axis of rotative adjustment of the holder.

3. In punching and shearing mechanism, the combination with a longitudinally movable supporting member, a tool holder movable therewith and rotatably adjustable thereon, said holder having a shear tool seat spaced from the axis of adjustment, whereby adjustment of the tool holder will provide variations in the angularity of the shear tool, a stationary supporting member, and a combined die and shear member rotatably adjustable therein.

In testimony whereof I affix my signature in presence of two witnesses.

ROBERT F. McCLOSKEY.

Witnesses:
F. E. GAITHER,
MARY BIAKA.